L. A. PETERSON.
CHANGE SPEED GEARING.
APPLICATION FILED APR. 19, 1913.
1,108,784.
Patented Aug. 25, 1914.
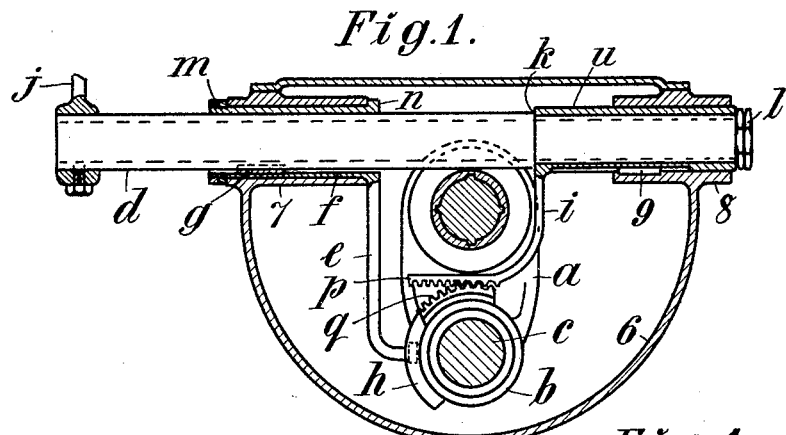
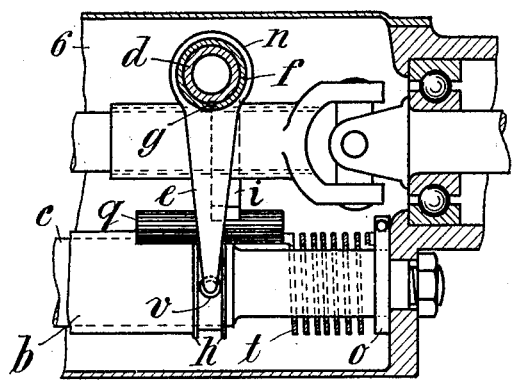
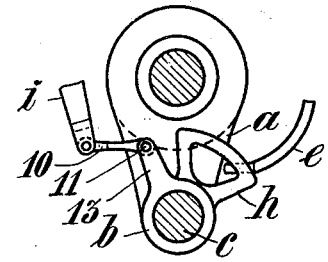
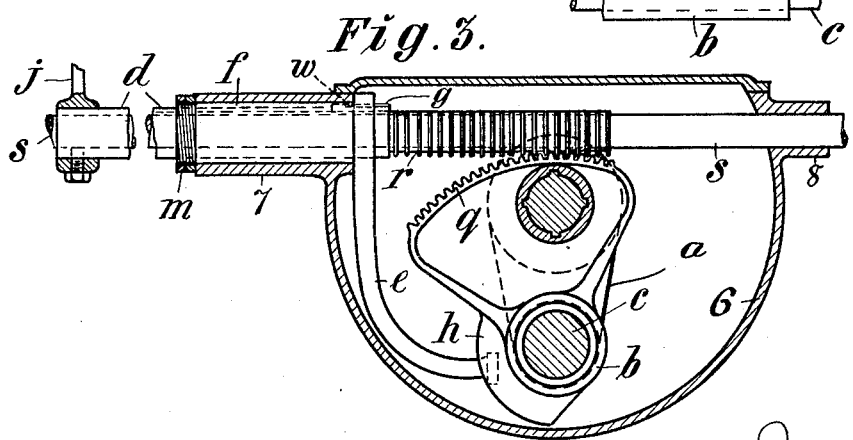

UNITED STATES PATENT OFFICE.

LARS AUGUST PETERSON, OF STOCKHOLM, SWEDEN.

CHANGE-SPEED GEARING.

1,108,784.  Specification of Letters Patent.  Patented Aug. 25, 1914.

Application filed April 19, 1913. Serial No. 762,248.

*To all whom it may concern:*

Be it known that I, LARS AUGUST PETERSON, a subject of the King of Sweden, residing at Stockholm, in the Kingdom of Sweden, have invented new and useful Improvements in Change-Speed Gearing, of which the following is a specification, reference being had to the accompanying drawing.

The invention relates to improvements in the change speed gearing for automobiles, motor boats and the like, described in my previous Patent No. 1,051,255, where the shaft of a gear, which is intended to engage any one of a series of coaxial gears of different size, is mounted in a support, adapted to be swung on and slid along a fixed shaft.

The object of the present invention is to simplify and improve the means for swinging and sliding the said support and to arrange and combine these means in such a manner that both the swinging and sliding of the support can be effected by a joint lever and by handling this lever in the same way as the corresponding lever is handled when using a change speed gearing of the older type, so that chauffeurs already trained for the old system will have no difficulty in managing automobiles with the new change speed system.

The mechanism consists of a horizontal transverse shaft or rod which is passed through the casing in which the gearing is inclosed and is rotatable and slidable in bearings in the side walls of the casing so that arms extending from said shaft inside the casing are adapted to swing and slide the support.

In the drawing three forms are shown as examples.

Figure 1 is a vertical cross section and Fig. 2 a vertical longitudinal section of one form. Fig. 3 is a vertical cross section of the second form. Fig. 4 is vertical cross section and Fig. 5 side view of a detail of the third form.

$a$ is the support, the nave $b$ of which is passed on the fixed shaft $c$ and adapted to rotate and slide on the same.

$d$ is the transverse shaft passed through the casing 6 and adapted to rotate and slide in bearings 7, 8 in the side walls of the casing. An arm $e$ has a nave $f$ passed on the shaft $d$ in the bearing 7 and engages the shaft by means of slot and key $g$ so as to partake in the rotation of the shaft $d$, while projections (a shoulder $n$ and nuts $m$) engage the ends of the bearing and prevent movement in axial direction. A stud or pin on the free end of arm $e$ or a roller $v$ passed thereon engages a groove on nave $b$ or enters between two parallel flanges $h$ on the nave so as to slide the support when the shaft $d$ is rotated. Another arm $i$ has a nave $u$ passed on shaft $d$ and engaging projections (shoulder $k$ and nuts $l$) on the shaft so as to partake in the sliding of the shaft, the nave $u$ being connected to the bearing 8 by slot and key 9 so as to not partake in the rotation of the shaft. The arm ends with a rack bar $p$ which engages a sector $q$ on the nave $b$ so as to swing the support by sliding the shaft $d$.

In Fig. 3 the sector $q$ has such dimensions that it reaches the shaft $d$. In this instance the arm $i$ and the rack bar $p$ may be dispensed with and substituted by circular grooves or teeth $r$ on shaft $d$. For enabling the insertion of shaft $d$ the teeth are cut away on the upper side and when the shaft is to be inserted said toothless side is turned downward, so as not to engage the sector $q$. After insertion the shaft is turned again so as to bring the toothless side upward, and then the key $g$ is inserted in its slot and locked by a cross pin $w$ or the like so as to remain in its place in the nave $f$. Then the nuts $m$ are screwed on its outer end.

Fig. 4 shows a form, where the rack bar is substituted by a link 10 connected to and adapted to slide on a pin 11 fixed in lugs 12, 13 of the nave $b$ as shown in Fig. 5, the arm $i$ or link 10 or both being preferably forked so as to avoid sidewise bending when the support $a$ is slid.

The shaft $d$ is managed by means of a handle or lever $j$ rigidly fixed on the shaft. In all forms the shaft $d$ may be tubular and serve as bearing for another shaft $s$ intended to actuate the brake.

For facilitating the swinging of support $a$ a spring or springs may be connected to the support and to a fixed point so as to balance that portion of the weight of the support which is not supported by the fixed shaft. In Fig. 2 such springs are represented by a coil spring $t$ passed on shaft $c$ and having one end connected to the nave $b$ (for instance by means of the sector $q$) and the other end to a split ring $o$ clamped on shaft $c$, the spring being made of a flattened steel band so as to be weak in axial direction and not essentially resist the sliding of the support.

It is obvious that either the rack bar or the sector should have the teeth extended axially so as to keep them engaged in all positions.

Claims:

1. In change speed control mechanism, the combination of a casing, a slidable and swinging support mounted therein, a shaft mounted on the casing, means intermediate the shaft and support to swing the latter on sliding the shaft, means intermediate the shaft and support to slide the latter on rotating the shaft, and operating means for the shaft.

2. In change speed control mechanism, the combination of a casing, a slidable and swinging support mounted therein, a shaft mounted on the casing, means including a toothed member intermediate the shaft and support to swing the latter on sliding the shaft, means intermediate the shaft and support to slide the latter on rotating the shaft, and operating means for the shaft.

3. In change speed control mechanism, the combination of a casing, a slidable and swinging support mounted therein, a shaft mounted on the casing, means comprising a toothed sector carried by the support and a member on the shaft engaging said sector whereby to swing the support on sliding the shaft, means intermediate the shaft and support to slide the latter on rotating the shaft, and operating means for the shaft.

4. In change speed control mechanism, the combination of a casing, a slidable and swinging support mounted therein, a shaft slidably and rotatably mounted on the casing and having a toothed element, a sector connected with said support and engaged by the toothed element aforesaid whereby on sliding the shaft the support will be swung, an arm rotatable with the shaft and engaging said support whereby to slide the latter when the shaft is turned, and means for actuating the shaft.

5. In change speed control mechanism, the combination of a casing, a shaft slidably and rotatably mounted thereon, a member for actuating the shaft, the shaft being provided with a toothed element, a slidable and swinging support mounted in the casing, a sector projecting from said support and engaging the toothed element of the shaft whereby on sliding the latter longitudinally the support aforesaid will be swung in a predetermined direction, and an arm rigid with the shaft and engaging the support whereby on rotating the shaft a sliding movement will be imparted to the support.

In testimony whereof I have signed my name to this specification in the presence of two subscribing witnesses.

LARS AUGUST PETERSON.

Witnesses:
R. LARSSON,
L. ANDERSON.

---

Copies of this patent may be obtained for five cents each, by addressing the "Commissioner of Patents, Washington, D. C."